(12) United States Patent
Goudon et al.

(10) Patent No.: US 9,624,102 B2
(45) Date of Patent: Apr. 18, 2017

(54) PYROTECHNIC PROCESS FOR PROVIDING VERY HIGH PURITY HYDROGEN AND ASSOCIATED DEVICE

(71) Applicant: HERAKLES, Le Haillan (FR)

(72) Inventors: Jean-Philippe Goudon, Maisons-Alfort (FR); Pierre Yvart, Ballancourt-sur-Essonne (FR); Fabrice Mantelet, Paris (FR); Frédéric Lesage, Athis-Mons (FR)

(73) Assignee: HERAKLES, Le Haillan (FR)

(*) Notice: Subject to any disclaimer, the term of this patent is extended or adjusted under 35 U.S.C. 154(b) by 0 days.

(21) Appl. No.: 14/651,717

(22) PCT Filed: Dec. 9, 2013

(86) PCT No.: PCT/FR2013/052991
§ 371 (c)(1),
(2) Date: Jun. 12, 2015

(87) PCT Pub. No.: WO2014/091127
PCT Pub. Date: Jun. 19, 2014

(65) Prior Publication Data
US 2015/0321909 A1    Nov. 12, 2015

(30) Foreign Application Priority Data
Dec. 12, 2012 (FR) ..................... 12 61946

(51) Int. Cl.
*B01J 19/24* (2006.01)
*H01M 8/06* (2016.01)
(Continued)

(52) U.S. Cl.
CPC ............ *C01B 3/0031* (2013.01); *B01J 19/24* (2013.01); *C01B 3/02* (2013.01); *C01B 3/065* (2013.01);
(Continued)

(58) Field of Classification Search
CPC ....... Y02B 90/18; Y02T 90/32; Y02E 60/324; Y02E 60/362; B01J 19/24; B01J 2219/24;
(Continued)

(56) References Cited

U.S. PATENT DOCUMENTS

| 2007/0065689 A1* | 3/2007 | Edlund | H01M 8/04022 429/410 |
| 2007/0084879 A1* | 4/2007 | McLean | C01B 3/0005 222/3 |

FOREIGN PATENT DOCUMENTS

| EP | 1 249 427 A1 | 10/2002 |
| EP | 1 405 823 A2 | 4/2004 |

(Continued)

OTHER PUBLICATIONS

Peter Haussinger et al: "Hydrogen, 3. Purification" In: "Ullmann's Encyclopedia of Industrial Chemistry", Oct. 15, 2011 Wiley-VCH Verlag GmbH & Co. p. 309-333.*

(Continued)

*Primary Examiner* — Stanley Silverman
*Assistant Examiner* — Syed Iqbal
(74) *Attorney, Agent, or Firm* — Pillsbury Winthrop Shaw Pittman LLP

(57) ABSTRACT

A pyrotechnic process for providing very high purity hydrogen, includes the combustion of at least one solid pyrotechnic charge capable of generating hydrogen-containing gas for the production of a pressurized hot hydrogen-containing gas that contains at least 70% by volume of hydrogen; and the purification of at least one portion of the pressurized hydrogen-containing gas, by passing through a metallic hydrogen separation membrane maintained at a temperature above 250° C., in order to obtain, at the outlet of the membrane, a hydrogen-containing gas that contains at least 99.99% by volume of hydrogen.

25 Claims, 1 Drawing Sheet

(51) Int. Cl.
*C01B 3/00* (2006.01)
*C01B 3/02* (2006.01)
*H01M 8/0606* (2016.01)
*C01B 3/06* (2006.01)
*C06D 5/06* (2006.01)

(52) U.S. Cl.
CPC ............ *C06D 5/06* (2013.01); *H01M 8/0606* (2013.01); *B01J 2219/24* (2013.01); *C01B 2203/0405* (2013.01); *C01B 2203/066* (2013.01); *C01B 2203/82* (2013.01); *H01M 2250/20* (2013.01); *H01M 2250/30* (2013.01); *Y02B 90/18* (2013.01); *Y02E 60/324* (2013.01); *Y02E 60/362* (2013.01); *Y02T 90/32* (2013.01)

(58) Field of Classification Search
CPC ......... H01M 2250/30; H01M 2250/20; H01M 8/0606; C01B 3/0031; C01B 3/02; C01B 3/065; C01B 2203/0405; C01B 2203/066; C01B 2203/82; C06D 5/06
See application file for complete search history.

(56) References Cited

FOREIGN PATENT DOCUMENTS

| | | |
|---|---|---|
| EP | 1 405 824 A2 | 4/2004 |
| EP | 1 496 035 A2 | 1/2005 |
| FR | 2 790 751 A1 | 9/2000 |
| FR | 2 906 805 A1 | 4/2008 |
| FR | 2906805 A1 * | 4/2008 |
| FR | 2 930 245 A1 | 10/2009 |
| FR | 2930245 A1 * | 10/2009 |
| WO | WO 2006/067156 A1 | 6/2006 |
| WO | WO 2009/138629 A1 | 11/2009 |

OTHER PUBLICATIONS

Burkhanov, G.S., et al., "Palladium-Based Alloy Membranes for Separation of High Purity Hydrogen from Hydrogen Containing Gas Mixtures," in Platinum Metals Rev., 2011, 55, (1), 3-12.

Häussinger, P. et al., "Hydrogen, 3. Purification" Ullmann's Encyclopedia of Industrial Chemistry, vol. 18, p. 309-333, (Oct. 15, 2011).

International Search Report as issued in International Patent Application No. PCT/FR2013/052991, dated Feb. 25, 2014.

* cited by examiner

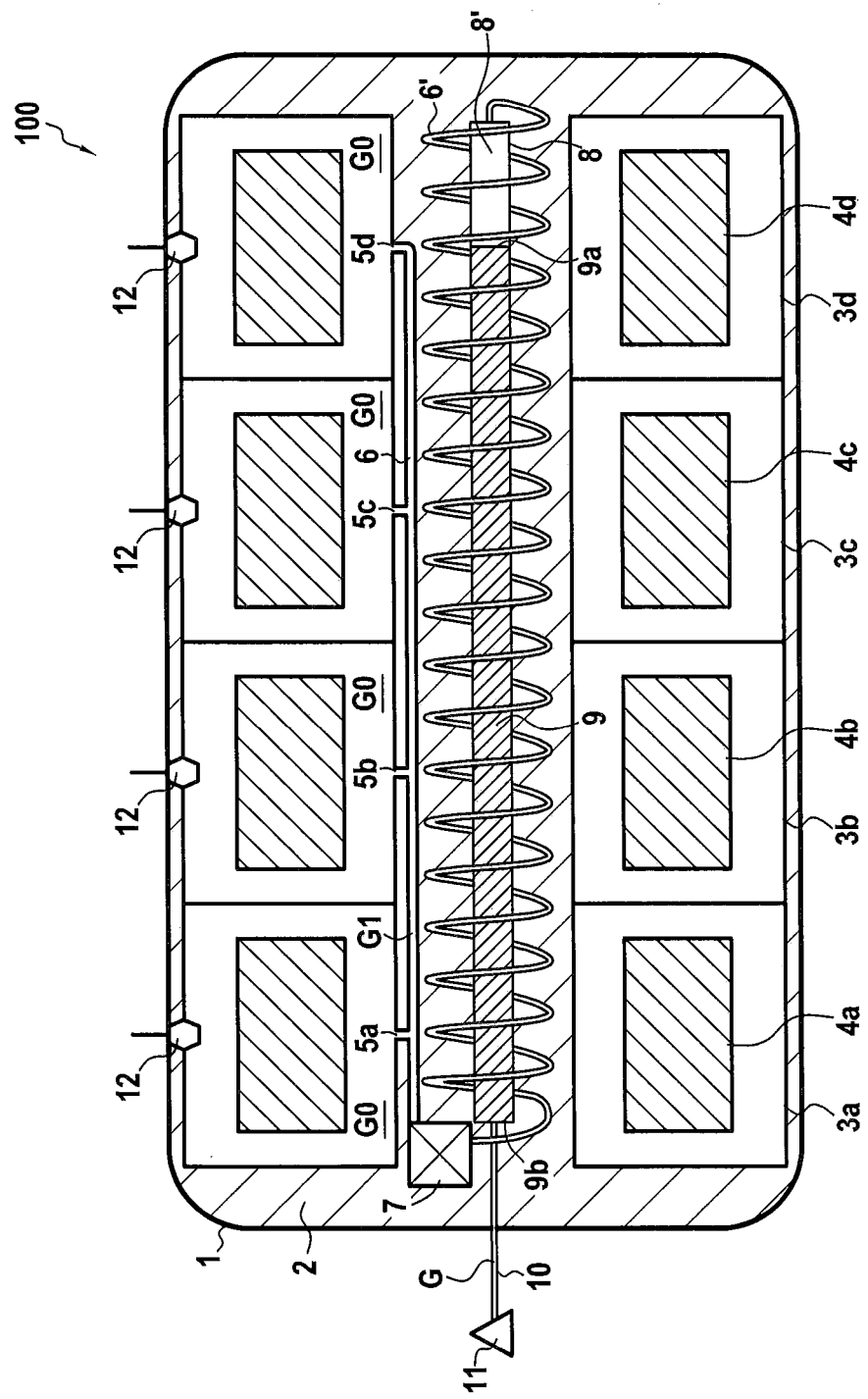

PYROTECHNIC PROCESS FOR PROVIDING VERY HIGH PURETY HYDROGEN AND ASSOCIATED DEVICE

CROSS REFERENCE TO RELATED APPLICATIONS

This application is the U.S. National Stage of PCT/FR2013/052991 filed Dec. 9, 2013, which in turn claims priority to French Application No. 1261946, filed Dec. 12, 2012. The contents of both applications are incorporated herein by reference in their entirety.

One subject of the present invention is a pyrotechnic process for providing very high purity hydrogen. Said process is advantageously carried out in order to supply portable or onboard fuel cells. Another subject of the present invention is a device suitable for carrying out said process.

The invention very particularly finds an application in the context of supplying hydrogen to low- and medium-power (1 to 100 watts) fuel cells, used in aeronautical and military fields, such as those equipping drones and those equipping foot soldiers. The electric powers targeted in this context are around ten times higher than the powers consumed by the portable electrical equipment, such as cell phones. The field of application of the invention may be extended to onboard fuel cells of higher power, of several tens of kilowatts, used, for example, for supplying electric generators of aeronautical emergency services.

Fuel cells are alternative sources of electrical energy that provide a solution to the new energy and environmental requirements. Fuel cells have an onboard energy density potential at least four times greater than that of lithium batteries. They do not release greenhouse gases.

The production of hydrogen for supplying fuel cells with fuel is therefore a topical technical problem, which is the subject of much research.

Processes for producing hydrogen by cracking of hydrocarbons, by thermolysis (thermal decomposition in the absence of an oxidizing agent) of hydrides and by hydrolysis of hydrides have already been described.

Another approach developed is based on the use of solid pyrotechnic materials that generate hydrogen by combustion. It makes it possible to do away with the problem of permanent storage of (liquid or gaseous) fluid. It is particular advantageous insofar as said materials exhibit high stability under storage conditions and great simplicity of use.

Such hydrogen-generating solid pyrotechnic materials have in particular been described in patent applications EP 1 249 427, EP 1 405 823, EP 1 405 824, EP 1 496 035 and EP 2 265 545. They are in the form of blocks, pellets, disks or grains. Their composition generally contains a hydrogen-containing reducing component of inorganic hydride, borazane or aminoborane polymer (polyaminoborane) type and an inorganic oxidizing component. Their combustion generates hydrogen with a good yield (~11% to 13% theoretical yield by weight, i.e. ~70 mol/kg). Their combustion temperature (~800 K, depending on the formulations), which is not excessive (see below), is high enough so that the reaction is self-sustaining after ignition. The self-sustaining combustion of these materials is favored by the pressurization in the combustion chamber. Such materials produce hydrogen-containing gas, having a high content of hydrogen, containing at least 70% by volume of hydrogen.

The gases supplying a fuel cell must be free, or at the very least contain extremely small amounts, of species such as $CO$, $NH_3$, $Cl_2$ and $H_2S$ that are capable of poisoning the catalyst of said fuel cell. Said gases must also be at suitable temperatures (below 473 K, ideally below 350 K to date, in order to conserve the fuel cell membrane) and at low overpressures (ideally of several millibar up to 5 bar) with respect to the ambient (atmospheric) pressure. Finally, the particle content of said gases must be very low.

With reference to such specifications, the composition of the hydrogen-generating solid pyrotechnic materials is in principle optimized in order to generate as little as possible of such gaseous species that are poisons for (the catalyst of) the fuel cell (in any case, the hydrogen-containing gases produced by these materials are always capable of containing, at low contents, species that, are poisons for the fuel cell and it is opportune to purify them in order to deliver hydrogen having a purity of greater than 99.9% by volume to said fuel cell in order to guarantee its service life), and in order to burn at a moderate temperature (it is always desirable to lower the temperature of the hydrogen-containing gases, produced by the combustion of these materials at a temperature of around 800 K (see above), in order to deliver hydrogen at a temperature of below 473 K, ideally below 350 K, to the fuel cell). The hydrogen-containing gases produced by the combustion of said materials are also opportunely filtered in order to trap the solid particles that they carry (particles that have not been retained in the gangue resulting from the combustion). The filters used for trapping said solid particles comprise for example, an arrangement of one or more corrugated metal grids or an arrangement of metallic elements having pores (of several millimeters to several nanometers in diameter).

Patent application FR 2 906 805 describes a process for providing unpressurized hydrogen that comes under the approach specified above. Said process comprises the combustion, at high pressure, of at least one solid pyrotechnic charge in at least one combustion chamber, said combustion generating hydrogen, and the flow of said hydrogen generated in at least one reservoir of larger volume. This document does not really tackle the technical problem of the purification of the hydrogen generated. Neither does it does tackle the technical problem of the control of the temperature of said hydrogen generated.

Furthermore, a person skilled in the art knows devices for the purification (selective filtration) of hydrogen-containing gases, which contain metallic hydrogen separation membranes, composed, for example, of palladium or of a metal alloy containing palladium. On this subject, reference may be made to the teaching of "Palladium-based alloy membranes for separation of high purity hydrogen from hydrogen containing gas mixture", in Platinum Metal Rev., 2011, 55, (1), 3-12, to the teaching of "Hydrogen, 3. Purification" in Ullmann's Encyclopedia of Industrial Chemistry, Vol. 18, p. 309-333, (2011 Oct. 15), to the teaching of patent application WO 2006/067156, or to that of patent application FR 2 790 751. The efficiency of these membranes is optimal when they are at temperatures in the vicinity of 300-600° C. (said membranes are then activated) and when the hydrogen-containing gas is provided under pressure (which enables the permeation of the hydrogen through said membranes), typically of several bar to 50 bar, with respect to the delivery pressure atmospheric pressure) of the purified hydrogen (at the outlet of said membranes). Under these conditions, the hydrogen delivered by the membrane reaches purities of 99.999%. These (temperature and pressure) operating conditions are easily manageable during the production of hydrogen in an industrial environment by cracking of hydrocarbons, but the use of such cracking operations would require complex structures regarding portable or onboard systems. Moreover, the cracking of hydrocarbons (just like the thermolysis of a hydride) is an energy-consuming operation. Furthermore, in a context of generating hydrogen by hydrolysis of a hydride, the membrane is usually heated by means of electric resistance heaters, which is also detrimental from an energy viewpoint. The process described in application US 2007/0084879, which combines a generation of hydrogen by hydrolysis or thermolysis of a hydride, and a purification of said generated hydrogen by passing through a membrane of palladium membrane type (other types of membranes being cited), thus hardly appears to be advantageous from an energy viewpoint.

The use of metallic hydrogen separation membranes, although resulting in high purity hydrogen, therefore still remain restrictive on account of the temperature and pressure operating conditions of said membranes. To the knowledge of the inventors, this use has never been combined directly with the pyrotechnic production of hydrogen-containing gas. The inventors recommend such a combination, which is particularly advantageous with reference to the technical problem summarized hereinbelow: the provision of very high purity hydrogen, under conditions that are advantageous from the energy viewpoint (the combustion (upstream) of a pyrotechnic charge hardly requiring energy and generating on the other hand (downstream) a pressurized hot gas. This pressure is obviously opportune (see below) and, with reference to the temperature parameter, the implementation of the process of the invention may be optimized (see the advantageous variants for implementation of the process of the invention recommended below)), and from the point of view of simplicity and space requirement of the combined device, which is perfectly suitable for portable or onboard systems.

With reference to the technical problem of the provision (on demand) of very high purity hydrogen (under particularly advantageous implementation conditions), the Applicant therefore proposes an efficient solution, based on the combustion of at least one solid pyrotechnic charge capable of generating hydrogen-containing gas (hydrogen-containing gas that already contains a substantial amount of hydrogen), then the purification, through a metallic hydrogen separation membrane, of at least one portion of the hydrogen-containing gas generated (generally of the hydrogen-containing gas generated), in order to obtain very high purity hydrogen; said very high purity hydrogen being suitable in particular for supplying a fuel cell. Said solution is analyzed in terms of process and device.

According to its first subject matter, the present invention therefore relates to a process for providing very high purity hydrogen. Said process comprises:

the combustion of at least one solid pyrotechnic charge capable of generating hydrogen-containing gas for the production of a pressurized hot hydrogen-containing gas that contains at least 70% by volume of hydrogen; and the purification of at least one portion of said pressurized hydrogen-containing gas, by passing through a metallic hydrogen separation membrane maintained at a temperature above 250° C., advantageously between 300° C. and 600° C., in order to obtain, at the outlet of said membrane, a hydrogen-containing gas that contains at least 99.99% by volume of hydrogen.

The combustion of the at least one pyrotechnic charge is triggered, in a manner known per se, by the user system starting from the appearance of the operational energy requirement. It generates, in a manner known per se, within the (each) combustion chamber containing the (a) pyrotechnic charge, hot (~800 K, see above) hydrogen-containing gas at high pressure (the operating pressure of the at least one combustion chamber is generally between $10^6$ Pa and $10^7$ Pa (between 10 and 100 bar)). Several (identical or not, generally identical) pyrotechnic charges each arranged in a combustion chamber may be ignited simultaneously or sequentially according to the hydrogen demand. The pyrotechnic charge(s) used is (are) suitable for generating a hydrogen-containing gas that contains at least 70% by volume of hydrogen. Specifications regarding such charges are given later on in the present text. The hydrogen-containing gas generated is delivered, hot, under pressure (generally at a pressure less than or equal to 10 bar, more generally at a pressure of several bar), to the outlet of the combustion chamber in which it was generated, hot, at high pressure. A person skilled in the art knows how to adjust the surface area of the gas delivery orifice (or of the gas delivery orifices, if the combustion chamber in question possesses several thereof) in order to adjust the pressure and flow for delivery of said gas.

Within the context of the implementation of the process of the invention, at least one portion of the pressurized, pyrotechnically-generated hydrogen-containing gas is brought into contact (passed through) a metallic hydrogen separation membrane (hot, activated membrane) for the purification thereof. It should be understood that at least one portion of the hydrogen-containing gas delivered has passed through such a membrane, irrespective of the exact arrangement of the combustion chamber(s) (in operation) present and membrane(s) present. Thus, it is in particular possible that a single combustion chamber discharges into a single membrane or into several membranes arranged in parallel, whether n combustion chambers are connected to a single membrane or whether each of the n chambers is connected to one membrane . . . . Mention has furthermore been made of "one" membrane but it is readily understood that a purification carried out successively on at least two membranes arranged in series could not be excluded from the context of the invention. In any case, within the context of the process of the invention, at least one portion of the hydrogen-containing gas recovered at the outlet of the combustion chamber(s) is purified by passing through (at least) one membrane. For the simplification of the description of the process of the invention, reference will be made hereinbelow to the metallic separation membrane. It has been indicated that at least one portion of the pyrotechnically-generated hydrogen-containing gas is thus purified. In general, all of the hydrogen-containing gas generated is thus purified but it could not be excluded from the context of the present invention that a portion of the pyrotechnically-generated hydrogen-containing gas is not sent for purification to the metallic membrane but used for another purpose (for other purposes).

The membrane is supplied with (pyrotechnically-generated) hydrogen-containing gas that is pressurized and that contains at least 70% by volume of hydrogen. It discharges this hydrogen-containing gas, which is not pressurized due to the pressure drop that it experiences within said membrane, and which contains at least 99.99% by volume of hydrogen. It therefore makes it possible to substantially strip said hydrogen-containing gas of the gaseous species, other than hydrogen, that are present within it. It makes it possible in particular to strip it of the species that are poisons for a fuel cell. It therefore makes it possible to lower the pressure of said hydrogen-containing gas. The hydrogen-containing gas obtained at the outlet of said membrane is therefore the desired unpressurized very high purity hydrogen. It is perfectly suitable for supplying fuel cells.

The metallic hydrogen separation membrane (used, within the context of the implementation of the process of the invention, for purifying pyrotechnically-produced hydrogen-containing gas, immediately after its production) is of the type of those described in the prior art. It is preferably a membrane made of palladium or made of an alloy that includes palladium.

It has been understood that the process of the invention comprises supplying the metallic separation membrane with hydrogen-containing gas produced under pressure, which very obviously is favorable to the permeation of said gas through said membrane. Irrespective of the exact variant of implementation of the process of the invention, it is therefore a pressurized gas which supplies the metallic separation membrane. The pressure of the gas generated during the first step of the process is thus used for the implementation of the second step of said process.

With reference to the temperature parameter of the gas to be purified, the following may be specified. Considering the current metallic hydrogen separation membrane technologies, technologies undoubtedly destined to evolve, it is preferable to inject into the hot membrane hydrogen-containing gas at a temperature that is not too high, typically below 473 K (200° C.) (the operation of the membranes is to date optimal at high temperature with "cold" gases). Since the pyrotechnically-produced gas is at around 800 K (~527° C.), it is therefore recommended to cool it before it passes into the membrane.

For the implementation of the purification of the pressurized hydrogen-containing gas, within the context of the process of the invention, the gas is passed through (at least) one membrane brought to a temperature above 250° C., advantageously to a temperature between 300° C. and 600° C.

The membrane may be heated, in order to maintain it at an appropriate temperature, according to conventional processes, for example by means of an electric resistance heater. Heating of the membrane by the hydrogen-containing gas produced by the combustion of the at least one pyrotechnic charge may also be conceived. This method of heating is not, in the present state of the technologies of the membranes (the filtration operation of which is optimal at high temperature with injection of "cold" hydrogen-containing gas), really recommended. Within the context of the implementation of advantageous variants of the process of the invention (see below), there is, in order to at least partly provide this heating, transfer of heat generated by the combustion of the at least one pyrotechnic charge and/or taken from the gaseous products generated by the combustion of the at least one pyrotechnic charge, to the metallic separation membrane. This makes it possible to avoid, or at the very least to minimize, the provision of necessary heat by means of an energy-consuming system (such as an electric resistance heater) in order to maintain said membrane at a temperature at which it is effective, or even very effective.

Thus:
  according to one advantageous variant of implementation of the process of the invention (pyrotechnic generation of hydrogen-containing gas then purification of at least one portion thereof), the heat produced by the combustion of the at least one pyrotechnic charge is partly used to carry out the purification, i.e. to continuously heat the metallic separation membrane. The heat transfer opportunely takes place by thermal conductivity, a conductive heat exchanger then connecting the combustion chamber(s) with the metallic membrane. Said heat exchanger, making a thermal bridge, may exist in various, more or less embodied, forms. It may consist of the air filling the (advantageously confined and minimized) spaces between said combustion chamber(s) and said membrane or preferably of a (solid) material arranged in said spaces, a material (such as a metal that is in the form of beads, filings or particles) which advantageously has a high thermal conductivity (from typically 50 W/m·K (for steel) to 380 W/m·K (for copper)). It is already understood that the process of the invention is advantageously carried out with optimization of such a transfer of the heat of combustion to the filtration membrane (optimization with regard to the distances in question, the contacts made and the thermal conductivity of the material used for embodying the thermal bridge);
  according to another advantageous variant of implementation of the process of the invention that includes continuous heating of the membrane, which is independent, of the previous one (use of a portion of the heat of combustion generated in the combustion chamber(s), during the implementation of the purification) but which is advantageously combined therewith, the hydrogen-containing gas produced (which is hot; a combustion temperature of around 800 K was mentioned above) is cooled before its purification (it is understood that the at least one portion of the hot hydrogen-containing gas generated intended to be purified may thus be cooled and that generally all of the gas is thus cooled). Such cooling is opportune with reference to the passage through the metallic membrane (see above) and to the subsequent use of said purified gas (for example for supplying a fuel cell). The hydrogen-containing gas produced may in particular be cooled (at least partly or completely) by being circulated with heat exchange (its circulation pipe then acting as a heat exchanger), before coming back into contact with the metallic separation membrane. Very advantageously, the heat thus transferred from the hot hydrogen-containing gas is (partly) released to the metallic membrane. Thus, in addition to a portion of the heat of combustion, a portion of the heat transported by the (hot) hydrogen-containing gas produced may be used for heating the metallic membrane. The purification of the hydrogen-containing gas may thus be carried out with optimal use of the heat generated during the combustion.

The process of the invention comprising the aforementioned combustion and purification steps is therefore advantageously carried out with recovery of a portion of the amount of heat generated during the combustion in order to carry out the purification; it is very advantageously carried out with recovery of a portion of the amount of heat generated during the combustion in order to carry out the purification and with cooling of the hydrogen-containing gas produced, a portion of the amount of heat extracted during said cooling being itself also recovered in order to carry out the purification. Incidentally, it will be noted here that the heat from the hydrogen-containing gas produced is in fact also heat generated during the combustion. The distinction made above (with reference to the recovery of heat) is made with reference to the location of the heat exchanges 1) at the at least one combustion chamber, 2) at the circulation, outside of the combustion chamber, of the hydrogen-containing gas delivered.

Within the context of the implementation of the process of the invention, the at least one portion of the hydrogen-containing gas produced (generally all thereof) intended to be purified, is, in addition, advantageously filtered before coming into contact with the metallic separation membrane in order to be stripped (at least partly) of the solid particles that it contains (residues of combustion of the pyrotechnic charge that are entrained, not trapped in the combustion gangue). The filtration may be carried out conventionally (see the introduction of the present text). Assuming at least one portion of the hydrogen-containing gas produced is also cooled before its purification, it is advantageously filtered then cooled.

The process of the invention, as described above, therefore comprises, advantageously, the 4 successive steps below:

(pyrotechnic) production of pressurized hot hydrogen-containing gas, filtration of at least one portion of said pressurized hot hydrogen-containing gas, cooling of said at least one portion of said filtered pressurized hot hydrogen-containing gas, and purification of said at least one portion of said cooled filtered pressurized hot hydrogen-containing gas;

carried out, preferably, with recovery of a portion of the amount of heat generated during the combustion in order to carry out the purification;

carried out, even more preferably, with recovery of a portion of the amount of heat generated during the combustion and of a portion of the amount of heat extracted during the cooling in order to carry out the purification.

These 4 successive steps are generally carried out with filtration, cooling and purification of all the pyrotechnically-produced hydrogen-containing gas.

With reference to the temperature parameter of the purified gas, the following may generally be specified. The temperature of the purified gas must not be excessive in view of the use that is made thereof. It was specified above that, in order to supply the fuel cell, the temperature of the gas should not exceed 473 K.

With reference to the start-up phase of the process of the invention (with a cold membrane), the following may be indicated.

The membrane must undergo a "preheating" phase that ensures the temperature conditioning thereof.

Within the context of use of heating means of the electric resistance heater type, no problem is faced. Within other contexts, it is possible in particular to proceed as follows.

According to a first variant of start-up of the process of the invention, hydrogen-containing gas produced by the combustion of at least one solid pyrotechnic charge that generates hydrogen-containing gas is injected hot (without cooling) into the membrane and ensures the preheating thereof. Once the membrane is thus preheated (rendered operational), the hot hydrogen-containing gas produced (at least in part, generally in its entirety) is advantageously cooled before being brought into contact with the membrane brought to its operating temperature (it was seen above that the operation of the membranes is optimal at high temperature with "cold" gases). For its cooling (as indicated above), the hydrogen-containing gas produced (at least in part, generally in its entirety) may in particular be circulated in a pipe with heat exchange (its circulation pipe then acting as a heat exchanger), before coming into contact with the metallic separation membrane. According to this first variant of start-up, it may be considered that the process is self-starting.

According to a second variant of start-up of the process of the invention, a (supplementary) pyrotechnic charge, referred to as a preheating pyrotechnic charge, is used to provide the heat necessary (at least a portion thereof) for heating up the membrane, before the passage of hydrogen-containing gas in said membrane during the implementation of the process. The preheating of the membrane may then be carried out either by direct heat transfer (between the preheating pyrotechnic charge being combusted, more precisely the combustion chamber containing it, and the membrane) or by indirect heat transfer (via the gases generated by the combustion of the preheating pyrotechnic charge circulated in a heat exchanger "in contact with" the membrane). The preheating pyrotechnic charge advantageously consists of a solid propellant charge. The solid propellant in question is not necessarily capable of generating a gas essentially consisting of hydrogen. A standard solid propellant of composite type may be suitable. Within the context of this second variant of start-up of the process, in addition to the heat produced by the combustion of the preheating charge, the heat produced by the combustion of the at least one pyrotechnic charge may also be partly used for preheating the metallic separation membrane.

It is now proposed to give specifications regarding the pyrotechnic charges suitable for the implementation of the process of the invention.

Said charges may consist of charges from the prior art, consisting of at least one product of conventional type, i.e. of block, disk, pellet, grain, etc. type, with a composition of the type: inorganic oxidizing component(s)+hydrogen-containing reducing component(s) (see the introduction of the present text). In any case, the at least one pyrotechnic charge used for the implementation of the process of the invention is selected in order to pyrotechnically generate a hydrogen-containing gas that contains at least 70% by volume of hydrogen. Indeed it is from such a hydrogen-containing gas that the membrane purification generates the desired very high purity hydrogen.

Suitable in particular for the implementation of the process of the invention are the pyrotechnic charges consisting of at least one pyrotechnic product containing, for at least 96% of its weight, at least one inorganic oxidizing component and at least one hydrogen-containing reducing component selected from inorganic hydrides, borazane and polyaminoboranes. The at least one inorganic oxidizing component (generally a single inorganic oxidizing component is present but the presence of at least two as a mixture could not be excluded) and the at least one specific hydrogen-containing reducing component (generally a single hydrogen-containing reducing component as identified above is present but the presence of at least two as a mixture could not be excluded) therefore represent at least 96% by weight (or even at least 98% by weight, or even 100% by weight) of the weight of the pyrotechnic product(s) advantageously used for generating, according to the invention, the combustion gases. The possible balance to 100% in general consists of additives, of the type of process additives, stability additives, static electricity desensitizing additives (such as $SiO_2$) and/or ballistic or combustion modifiers. The presence of impurities is not excluded.

With reference to said at least one hydrogen-containing reducing component, it is possible, in no way limitingly, to specify the following.

1) The at least one inorganic hydride capable of being present in the composition of the pyrotechnic products used is advantageously a borohydride, very advantageously an alkali metal or alkaline-earth metal borohydride. Preferably said at least one inorganic hydride is selected from sodium, lithium or magnesium borohydride. The pyrotechnic products used in the process of the invention therefore preferably contain in their composition, as inorganic hydride, $NaBH_4$, $LiBH_4$ or $Mg(BH_4)_2$.

2) The at least one hydrogen-containing reducing compound however preferably consists of borazane or an aminoborane polymer (a polyaminoborane). Particularly preferably, borazane is the only hydrogen-containing reducing compound present in the composition of the pyrotechnic products used.

With reference to said at least one inorganic oxidizing component, it is possible, in no way limitingly, to specify the following.

It is advantageously selected from those used according to the prior art in the technical field of fuel cells; i.e. from:
- perchlorates (it very advantageously consists of ammonium perchlorate),
- dinitramides (it very advantageously consists of ammonium dinitramide),
- nitrates (it very advantageously consists of strontium nitrate), and
- metal oxides (it advantageously consists of iron oxide ($Fe_2O_3$), vanadium oxide ($V_2O_5$), aluminum oxide ($Al_2O_3$), titanium oxide ($TiO_2$), manganese oxide ($MnO_2$), preferably of iron oxide ($Fe_2O_3$)).

The pyrotechnic products (constituents of the pyrotechnic charges) used in the process of the invention therefore very advantageously contain $NH_4ClO_4$, $NH_4N(NO_2)_2$, $Sr(NO_3)_2$ or $Fe_2O_3$.

Within the context of this variant, the pyrotechnic product(s) used preferably contains (contain) in its (their) composition:
- from 40% to 80% by weight of at least one hydrogen-containing reducing component as identified above (generally of one such hydrogen-containing reducing component), and
- from 20% to 60% by weight of at least one inorganic oxidizing agent (generally of one such inorganic oxidizing agent).

They contain, particularly preferably:
- from 55% to 75% by weight of at least one hydrogen-containing reducing component as identified above (generally of one such hydrogen-containing reducing component), and
- from 25% to 45% by weight of said at least one inorganic oxidizing agent (generally of one such inorganic oxidizing agent).

It is, generally, also very advantageous for said pyrotechnic product(s) to contain more than 50% by weight of hydrogen-containing reducing component(s), more advantageously still for said pyrotechnic product(s) to contain more than 70% by weight of hydrogen-containing reducing component(s). It has been understood that said hydrogen-containing reducing component(s) present constitute(s) the reserve of hydrogen.

It is recalled here, for useful purposes, that said at least one pyrotechnic charge used for the generation of the hydrogen-containing gases consists of at least one pyrotechnic product (generally several) in the form of grains, pellets, disks or blocks. These grains, pellets and blocks have any shape, for example spherical, ovoid or cylindrical. The grains generally have a weight of several milligrams, the pellets a weight of several tenths of grams to several grams, the disks of several tens of grams to several hundreds of grams and the blocks of around a hundred grams to several kilograms.

The processes for obtaining these solid pyrotechnic products are known processes, described in particular in the EP patent applications identified on page 2 of the present text.

It has been understood that said at least one pyrotechnic charge used generally contains several pyrotechnic products (although the use of a single product, such as a block, is in no way excluded). Within such a context, not all the products constituting said at least one charge necessarily have the same composition (or the same shape). However they do all generate hydrogen-containing gas within the meaning of the invention.

Said at least one pyrotechnic charge burns following its ignition. The ignition device generally consists of an igniter, in connection with the user system, through a leaktight passage that withstands the operating pressure, and optionally at least one ignition relay charge. Advantageously, when the user system allows, the igniter is triggered by mechanical stress (for example by means of a piezoelectric relay or a fuse striker), in order to avoid any superfluous consumption of electrical energy in order to trigger the system. Thus, the process of the invention is advantageously set in motion by mechanical stress.

In view of the above remarks, it is understood that the process of the invention is very particularly suitable for supplying portable or onboard fuel cells with very high purity hydrogen. The very high purity hydrogen delivered at the outlet of the metallic hydrogen separation membrane associated with the at least one combustion chamber is perfectly suitable for such a use.

In fact, the invention may entirely be analyzed as a process for supplying a fuel cell with very high purity hydrogen; said process comprising the pyrotechnic process of providing very high purity hydrogen, as described above (including a high-pressure combustion then a purification on a metallic hydrogen separation membrane of at least one portion (generally of all) of the hydrogen-containing gas produced) followed by the delivery of said high purity hydrogen to said fuel cell. However, it should incidentally be noted that the very high purity hydrogen, obtained on demand by the process of the invention, may also be used in other contexts.

According to its second subject matter, the present invention relates to a pyrotechnic device for providing (on demand) very high purity hydrogen. Said device is suitable for the implementation of the process described above, is suitable in fact for an advantageous implementation variant thereof (advantageous with reference to the heat exchanges). It characteristically comprises:
- at least one combustion chamber, provided with at least one delivery orifice, suitable for the arrangement and the high-pressure combustion, within it, of a solid pyrotechnic charge capable of generating hydrogen-containing gas, and also for the delivery of pressurized hot hydrogen-containing gas via said at least one delivery orifice;
- at least one metallic hydrogen separation membrane, suitable for the purification of hydrogen-containing gas, having an inlet face and an outlet face; said metallic hydrogen separation membrane being arranged in a reservoir so that an empty volume is created in said reservoir upstream of its inlet face; and
- means for delivering the purified gas;

said combustion chamber(s) and metallic hydrogen separation membrane(s) being connected via at least one pipe so that hydrogen-containing gas delivered from said combustion chamber(s) is sent to at least one metallic hydrogen separation membrane and being arranged within a thermally insulated enclosure; said delivery means being capable of ensuring the delivery of gas, purified within said metallic hydrogen separation membrane(s), out of said thermally insulated, enclosure.

The device of the invention is generally designed to send all of the hydrogen-containing gas generated to the at least one metallic hydrogen separation membrane but, as indicated above, it could not be excluded for it to include means, arranged between said at least one combustion chamber and said at least one metallic hydrogen separation membrane, for diverting a portion of said hydrogen-containing gas generated.

It has already been understood, considering the aforegoing, that numerous arrangements of the combustion chamber(s) and membrane(s) present are possible, it being understood that the very high purity gas to be delivered must be purified by passing through at least one membrane. It is noted that the use of a single membrane in combination with at least one combustion chamber is recommended and that the arrangement hereinbelow: at least one annular combustion chamber positioned around a metallic hydrogen separation membrane, is particularly preferred (in particular with reference to the transfer of the heat of combustion to the membrane).

It is furthermore understood that the (each) metallic hydrogen separation membrane is arranged in a reservoir (the device comprising a membrane in its reservoir can be described as a purification chamber), so that an empty volume is made in said reservoir upstream of the inlet face of said membrane (of each membrane). This empty volume is provided for the storage of the species (CO, $H_2O$, $NH_3$ . . . ) separated from the hydrogen by said membrane (in operation). The inlet face of a membrane is very obviously that intended to receive the pressurized hydrogen-containing gas to be purified and the outlet face is the one through which the unpressurized purified hydrogen-containing gas (containing more than 99.99% of hydrogen) is delivered.

Characteristically, the combustion chamber(s) and metallic separation membrane(s) of the device of the invention (chamber(s) and membrane(s) placed in communication) are positioned in a thermally insulated enclosure, the purified gas delivery means delivering said gas out of said thermally insulated enclosure. This arrangement is opportune for confining the various constituent elements of the device and aims to conserve the heat of combustion as best possible and to ensure a minima the heat transfers: heat from the combustion chambers and pipes for transporting the hot gas to the membrane(s).

For an optimization of said heat transfers, it is recommended: that the thermally insulated enclosure contains a material that provides a thermal bridge between said at least one combustion chamber (+the at least one pipe present) and said at least one metallic separation membrane; said material advantageously having a high thermal conductivity (see above). It has been seen that air is (a minima) capable of providing such a thermal bridge but that a material with a higher thermal conductivity, such as a metal (in the form of beads, filings or particles) is of course more efficient. It is in fact recommended to "fill" said thermally insulated enclosure with a material having a high thermal conductivity. The heat of combustion is thus "confined" in the thermally insulated enclosure and its transfer to the at least one membrane may be optimized.

The device of the invention is furthermore capable of comprising gas cooling means, presently the cooling of the pyrotechnically-generated hydrogen-containing gas (at least one portion thereof), which means are therefore arranged downstream of the at least one combustion chamber of the device. Said cooling means are arranged upstream of the at least one metallic separation membrane. They aim to protect said at least one membrane from the excessive heat of the combustion gases. In the same way they protect any device downstream that uses the very high purity hydrogen-containing gas.

It has been seen, within the context of the process, that heat withdrawn during this cooling, is advantageously transferred to the at least one membrane present. Thus, according to one advantageous embodiment, the means for cooling the pyrotechnically-generated hydrogen-containing gas consist of at least one portion of at least one pipe that connects at least one combustion chamber and at least one metallic separation membrane; said at least one portion winding around said at least one metallic separation membrane. Any pipe for circulating the hot gases generated, winding around a metallic separation membrane, is thus capable of carrying out the role of heat exchanger.

It is noted that, arranged within a material, a fortiori having high thermal conductivity, any pipe may in theory provide a certain cooling of the hot gases circulating within it . . . that the heat exchanger explained above is not necessarily present within a material providing a thermal bridge between the at least one combustion chamber and the at least one membrane . . . . It is understood however that in order to be in a position to ensure a maximum heat transfer to the at least one membrane present (and in order to thus increase its efficiency), the presence of a material providing the thermal bridge specified above (material advantageously having a high thermal conductivity) and that of a heat exchanger (consisting of at least one portion of a pipe for circulating hot gas between at least one combustion chamber and at least one membrane) around said at least one membrane are advantageously combined, within the thermally insulated chamber.

As regards the arrangement of said at least one combustion chamber, it is possible, in no way limitingly, to indicate the following. Said at least one combustion chamber is known per se. It generally consists of a mechanical assembly containing an ignition device or initiation module (such a module advantageously triggers the ignition via a mechanical stress. Such a module therefore advantageously comprises a piezoelectric relay or a fuse striker (see above)), a device for holding the main pyrotechnic charge (the various constituent elements of which (the presence of a single block is however expressly provided for) may be random or structured, so as to limit the space requirement) and optionally an ignition relay pyrotechnic pellet. The charge (which may therefore be a one-piece charge) is generally held in a basket, so that the combustion residues are retained in said basket (they constitute a gangue therein). When said charge consists of several elements, these are stabilized within said basket. Thus, the space requirement and the mechanical stresses of said elements in response to the vibrations of the system are limited. Said at least one combustion chamber comprises at least one delivery orifice for delivering (under pressure) gases generated within it (at high pressure).

Said at least one metallic hydrogen separation membrane of the device of the invention is known per se. It consists, as indicated above, advantageously, of a membrane made of palladium or made of an alloy containing palladium.

The device of the invention may also contain gas filtration means, presently for filtering the pyrotechnically-generated hydrogen-containing gas (at least one portion thereof), which means are capable of stripping said gas of at least one portion of the solid combustion residues that it contains and are arranged downstream of the at least one combustion chamber and upstream of the at least one metallic separation membrane, advantageously arranged upstream of the cooling means when such means are present. Such filtration means may for example comprise, as indicated in the introduction of the present text, an arrangement of one or more corrugated metal grids or an arrangement of metallic elements having pores (of several millimeters to several nanometers in diameter).

The means for delivering the purified gas generally essentially comprises a conventional duct. They are advantageously suitable for delivering said gas to the user system. Said user system, as indicated above, advantageously consists of at least one fuel cell. Thus, the device of the invention, as described above, is therefore advantageously arranged upstream of at least one fuel cell.

The device of the invention (at least one device of the invention) is advantageously integrated into the structure of a system, in particular of a portable or onboard system, for example of an airborne system. It may thus be integrated into the structure of an airborne vehicle, for example the fuselage or the wings of such a vehicle.

It is now proposed to illustrate the invention, in no way limitingly, by the appended FIGURE (FIG. 1). Said sole FIGURE schematically shows, in cross section, a device of the invention (according to one preferred embodiment) that is suitable for the implementation of the process of the invention (according to one preferred implementation variant).

The device 100 shown schematically in FIG. 1 comprises a thermally insulated jacket 1 containing four annular combustion chambers 3a, 3b, 3c, 3d each containing a pyrotechnic charge 4a, 4b, 4c, 4d capable of generating hydrogen-containing gas, and each equipped with a delivery orifice 5a, 5b, 5c, 5d opening into a pipe 6. Said four annular combustion chambers 3a, 3b, 3c, 3d are arranged in contact with a material 2 having a high thermal conductivity, for example iron filings, which material is also therefore contained within said thermally insulated jacket 1. The pipe 6 is connected to a particle filter 7, then winds (in its portion 6'), within the material 2 having a high thermal conductivity, in order to connect to a reservoir 8 containing a hydrogen separation membrane 9 (the inlet face of said membrane 9 is referenced 9a, its outlet face 9b). At its distal end with respect to its connection with the pipe 6, the reservoir 8 is provided with a duct 10 connected to a fuel cell 11.

The reservoir 8 has an empty volume 8' on the side of its connection with the pipe 6, which is used to store the gaseous residues separated from hydrogen by the membrane 9.

Each combustion chamber 4a, 4b, 4c, 4d contains an initiation module 12 for initiating its pyrotechnic charge 4a, 4b, 4c, 4d.

The operation of this device 100 is specified below.

One (several) of the 4 hydrogen-generating pyrotechnic charges 4a, 4b, 4c, 4d included in the combustion chambers 3a, 3b, 3c, 3d is (are) ignited (simultaneously or sequentially) by means of its (their) initiation module 12. The combustion of said charge(s) generates, in the combustion chamber(s) which contain(s) it (them), hot hydrogen-containing gas G0, at a high pressure (2 to $3\times10^6$ Pa (20 to 30 bar), for example). A portion of the heat of combustion produced in the combustion chamber(s) is absorbed by the material 2 having a high conductivity. The hot hydrogen-containing gas G0 at high pressure is delivered via the delivery orifice(s) 5a, 5b, 5c, 5d. It is transported, under pressure (at a lower pressure (than the pressure indicated above, operating pressure of the combustion chamber(s) in operation), generally of several bar to around 10 bar) in the pipe 6. Said gas delivered under pressure is referenced G1 in FIG. 1. It also exchanges heat with the material 2 having a high thermal conductivity. It is stripped (at least partly) of the solid combustion residues that it contains (solid residues not trapped in the gangue resulting from the combustion which remains in the combustion chamber(s) that has (have) operated) by passing through the particle filter 7. It is injected, cooled, still under pressure, into the reservoir 8 containing the metallic separation membrane 9. The cooling carried out is optimized insofar as said gas G1 is circulated around the membrane 9 (more specifically the reservoir 7 containing it), and within the material 2 having a high thermal conductivity. Said material 2 having a high conductivity therefore transfers heat, originating from the combustion chamber(s) that has (have) operated and from the pipe 6 (of the gas G1), to the hydrogen separation membrane 9, which is consequently heated. The rise in temperature of the membrane 9 is thus simultaneous with the production of the hydrogen-containing gases and favorable to the efficiency of the separation of hydrogen by said membrane 9. The hot hydrogen-containing gas G1, after having wound around in the pipe 6, penetrates into the reservoir 8 (through the empty volume 8') and comes into contact with the separation membrane 9 (with its inlet face 9a). The hydrogen is separated by the membrane 9 from the other gaseous species (present in a very small amount). It emerges from said membrane 9 via the outlet face 9b thereof and is delivered downstream, at a purity of greater than 99.99%, to the fuel cell 11.

The invention claimed is:

1. A pyrotechnic process for providing very high purity hydrogen, comprising:
   combusting at least one solid pyrotechnic charge capable of generating hydrogen-containing gas for the production of a pressurized hot hydrogen-containing gas that contains at least 70% by volume of hydrogen;
   purifying at least one portion of said pressurized hydrogen-containing gas, by passing through a metallic hydrogen separation membrane maintained at a temperature above 250° C., in order to obtain, at the outlet of said membrane, a hydrogen-containing gas that contains at least 99.99% by volume of hydrogen, and
   cooling at least one portion of said hydrogen-containing gas produced, before its purification thereof,
   wherein a portion of the amount of heat produced by the combustion of said at least one solid pyrotechnic charge capable of generating hydrogen-containing gas is used for heating said metallic separation membrane, said portion of the amount of heat produced by the combustion of said at least one solid charge capable of generating hydrogen-containing gas being transferred to said metallic separation membrane via a solid material, which acts as a thermal bridge, and
   wherein a portion of the amount of heat extracted during said cooling is used for heating said metallic separation membrane.

2. The process as claimed in claim 1, further comprising filtrating at least one portion of said hydrogen-containing gas produced in order to strip it at least partly of the solid combustion residues that it contains, said filtration being carried out upstream of the purification thereof.

3. The process as claimed in claim 1 comprising, successively, producing said hydrogen-containing gas, filtrating at least one portion of said hydrogen-containing gas in order to strip it at least partly of the solid combustion residues that it contains, cooling said at least one portion of said hydrogen-containing gas that has been filtered and purifying said at least one portion of the hydrogen-containing gas that has been filtered and cooled.

4. The process as claimed in claim 1, wherein said at least one solid pyrotechnic charge capable of generating hydrogen-containing gas is a pyrotechnic charge consisting of at least one pyrotechnic product containing, for at least 96% of its weight, at least one inorganic oxidizing component and at least one hydrogen-containing reducing component selected from inorganic hydrides, borazane and polyaminoboranes.

5. The process as claimed in claim 4, wherein said at least one hydrogen-containing reducing component selected from inorganic hydrides is selected from inorganic borohydrides.

6. The process as claimed in claim 4, wherein said at least one hydrogen-containing reducing component is selected from borazane and polyaminoboranes.

7. The process as claimed in claim 4, wherein said at least one inorganic oxidizing component is selected from perchlorates, dinitramides, nitrates and metal oxides.

8. The process as claimed in claim 4, wherein said at least one pyrotechnic product contains:
   from 40% to 80% by weight of said at least one hydrogen-containing reducing component, and
   from 20% to 60% by weight of said at least one inorganic oxidizing component.

9. The process as claimed in claim 4, wherein said at least one pyrotechnic product contains more than 50%, by weight of said at least one hydrogen-containing reducing component.

10. The process as claimed in claim 1, wherein the process is carried out for supplying at least one fuel cell.

11. A pyrotechnic device for providing very high purity hydrogen, suitable for carrying out the process as claimed in claim 1, comprising:
   at least one combustion chamber, provided with at least one delivery orifice, suitable for the arrangement and the high-pressure combustion, within it, of a solid pyrotechnic charge capable of generating hydrogen-containing gas, and also for the delivery of pressurized hot hydrogen-containing gas via said at least one delivery orifice;
   at least one metallic hydrogen separation membrane, suitable for the purification of hydrogen-containing gas, having an inlet face, and an outlet face; said metallic hydrogen separation membrane being arranged in a reservoir so that an empty volume is created in said reservoir upstream of its inlet face;
   means for delivering the purified gas;
   said combustion chamber(s) and metallic hydrogen separation membrane(s) being connected via at least one pipe so that hydrogen-containing gas delivered from said combustion chamber(s) is sent to at least one metallic hydrogen separation membrane and being arranged within a thermally insulated enclosure, said thermally insulated enclosure containing a solid material that provides a thermal bridge between said combustion chamber(s) and metallic separation membrane(s); said delivery means being capable of ensuring the delivery of gas, purified within said metallic hydrogen separation membrane(s), out of said thermally insulated enclosure; and
   means for cooling the gas, arranged downstream of the at least one combustion chamber and upstream of the at least one metallic separation membrane, said cooling means consisting of at least one portion of the at least one pipe that connects the at least one combustion chamber with the at least one metallic separation membrane, said portion winding around said at least one metallic separation membrane.

12. The device as claimed in claim 11, further comprising at least one annular combustion chamber arranged around at least one metallic separation membrane.

13. The device as claimed in claim 11, wherein said at least one metallic separation membrane is a membrane made of palladium or made of an alloy that contains palladium.

14. The device as claimed in claim 11, further comprising means for filtering the gas, that are capable of stripping it of at least one portion of the solid combustion residues that it contains, arranged downstream of the at least one combustion chamber and upstream of the at least one metallic separation membrane.

15. The device as claimed in claim 11, wherein the device is arranged upstream of at least one fuel cell.

16. The process as claimed in claim 1, wherein the metallic hydrogen separation membrane is maintained at a temperature between 300° C. and 600° C.

17. The process as claimed in claim 1, wherein the solid material, which acts as a thermal bridge, has a high thermal conductivity from 50 W/m·K to 380 W/m·K.

18. The process as claimed in claim 5, wherein said at least one hydrogen-containing reducing component selected from inorganic hydrides is selected from alkali metal and alkaline-earth metal borohydrides.

19. The process as claimed in claim 5, wherein said at least one hydrogen-containing reducing component selected from inorganic hydrides is selected from sodium, lithium and magnesium borohydrides.

20. The process as claimed in claim 6, wherein said at least one hydrogen-containing reducing component consists of borazane.

21. The process as claimed in claim 7, wherein said at least one inorganic oxidizing component is selected from ammonium perchlorate, ammonium dinitramide, strontium nitrate and iron oxide.

22. The process as claimed in claim 8, wherein said at least one pyrotechnic product contains:
   55% to 75% by weight of said at least one hydrogen-containing reducing component, and
   25% to 45% by weight of said at least one inorganic oxidizing component.

23. The process as claimed in claim 9, wherein said at least one pyrotechnic product contains more than 70% by weight of said at least one hydrogen-containing reducing component.

24. The device as claimed in claim 11, wherein the solid material providing a thermal bridge between said combustion chamber(s) and metallic separation membrane(s) has a high thermal conductivity from 50 W/m·K to 380 W/m·K.

25. The device as claimed in claim 14, wherein said means for filtering the gas are arranged upstream of the cooling means.

* * * * *